United States Patent
Lee et al.

(10) Patent No.: US 8,301,450 B2
(45) Date of Patent: Oct. 30, 2012

(54) APPARATUS, METHOD, AND MEDIUM FOR DIALOGUE SPEECH RECOGNITION USING TOPIC DOMAIN DETECTION

(75) Inventors: Jae-won Lee, Seoul (KR); In-jeong Choi, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 960 days.

(21) Appl. No.: 11/589,165

(22) Filed: Oct. 30, 2006

(65) Prior Publication Data

US 2007/0100618 A1    May 3, 2007

(30) Foreign Application Priority Data

Nov. 2, 2005 (KR) .................. 10-2005-0104462

(51) Int. Cl.
- *G06F 17/27* (2006.01)
- *G10L 15/00* (2006.01)
- *G10L 15/04* (2006.01)
- *G10L 17/00* (2006.01)
- *G10L 15/18* (2006.01)

(52) U.S. Cl. ............ 704/257; 704/9; 704/231; 704/250; 704/251

(58) Field of Classification Search .......... 704/250, 704/251, 231, 9, 257
See application file for complete search history.

(56) References Cited

U.S. PATENT DOCUMENTS

| | | | |
|---|---|---|---|
| 5,500,920 A * | 3/1996 | Kupiec | 704/270.1 |
| 5,526,443 A * | 6/1996 | Nakayama | 382/229 |
| 5,787,230 A * | 7/1998 | Lee | 704/235 |
| 5,887,120 A * | 3/1999 | Wical | 706/46 |
| 6,052,657 A * | 4/2000 | Yamron et al. | 704/9 |
| 6,104,989 A * | 8/2000 | Kanevsky et al. | 704/9 |
| 6,185,531 B1 * | 2/2001 | Schwartz et al. | 704/256.1 |
| 6,324,510 B1 * | 11/2001 | Waibel et al. | 704/256.7 |
| 6,631,351 B1 * | 10/2003 | Ramachandran et al. | 704/270 |
| 6,772,120 B1 * | 8/2004 | Moreno et al. | 704/256 |

(Continued)

FOREIGN PATENT DOCUMENTS

KR    10-2004-0069060    8/2004

(Continued)

OTHER PUBLICATIONS

Korean Office Action issued Oct. 30, 2006 in Korean Patent Application No. 10-2005-0104462.

*Primary Examiner* — Eric Yen
(74) *Attorney, Agent, or Firm* — Staas & Halsey LLP

(57) ABSTRACT

An apparatus, method, and medium for dialogue speech recognition using topic domain detection are disclosed. An apparatus includes a forward search module performing a forward search in order to create a word lattice similar to a feature vector, which is extracted from an input voice signal, with reference to a global language model database, a pronunciation dictionary database and an acoustic model database, which have been previously established, a topic-domain-detection module detecting a topic domain by inferring a topic based on meanings of vocabularies contained in the word lattice using information of the word lattice created as a result of the forward search, and a backward-decoding module performing a backward decoding of the detected topic domain with reference to a specific topic domain language model database, which has been previously established, thereby outputting a speech recognition result for an input voice signal in text form. Accuracy and efficiency for a dialogue sentence are improved.

18 Claims, 8 Drawing Sheets

U.S. PATENT DOCUMENTS

| | | | |
|---|---|---|---|
| 6,925,154 B2 * | 8/2005 | Gao et al. | 379/88.03 |
| 6,999,925 B2 * | 2/2006 | Fischer et al. | 704/243 |
| 7,292,977 B2 * | 11/2007 | Liu | 704/236 |
| 7,401,023 B1 * | 7/2008 | Schwartz et al. | 704/275 |
| 7,426,468 B2 * | 9/2008 | Coifman et al. | 704/275 |
| 2003/0023437 A1 * | 1/2003 | Fung | 704/236 |

FOREIGN PATENT DOCUMENTS

| | | |
|---|---|---|
| KR | 10-2005-0082249 | 8/2005 |
| WO | WO 2005050621 A2 * | 6/2005 |

* cited by examiner

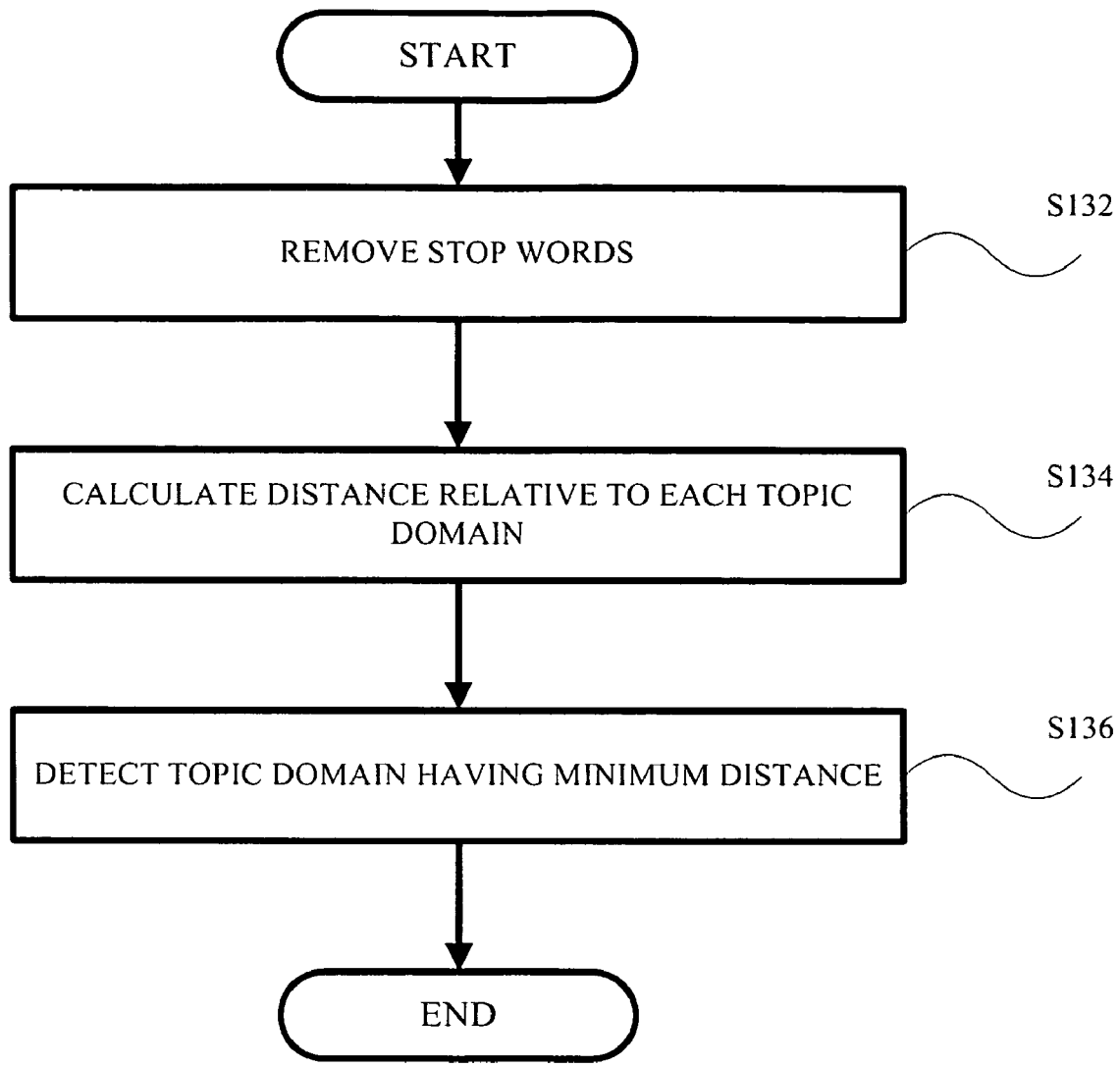

<Sentence(Utterance) Accuracy>

|       | Model A | Model B | Model C |
|-------|---------|---------|---------|
| 1     | 68.18%  | 71.21%  | 74.24%  |
| 2     | 65.66%  | 68.18%  | 72.22%  |
| 3     | 71.36%  | 71.35%  | 73.36%  |
| 4     | 65.99%  | 65.98%  | 70.55%  |
| 5     | 70.08%  | 74.80%  | 76.37%  |
| total | 68.11%  | 69.96%  | 73.12%  |

APPARATUS, METHOD, AND MEDIUM FOR DIALOGUE SPEECH RECOGNITION USING TOPIC DOMAIN DETECTION

CROSS-REFERENCE TO RELATED APPLICATIONS

This application claims the benefit of Korean Patent Application No. 10-2005-0104462, filed Nov. 2, 2005, in the Korean Intellectual Property Office, the disclosure of which is incorporated herein by reference.

BACKGROUND OF THE INVENTION

1. Field of the Invention

The present invention relates to an apparatus, method, and medium for speech recognition, and more particularly to an apparatus, method, and medium for dialogue speech recognition using topic domain detection that can detect a dialogue topic of a speaker during the dialogue and employ a topic-based language model, thereby improving performance of dialogue speech recognition.

2. Description of the Related Art

Speech recognition technology is used to recognize or understand what people are saying by analyzing speech via a computer. Speech is converted into an electrical signal, and frequency characteristics of the voice signal are extracted from the electrical signal based on the fact that speech has a specific frequency depending on the shape of the mouth shape and the position of the tongue, thereby recognizing the pronunciation. Recently, the speech recognition technology has been extensively used in various applications, such as phone dialing, language studies, and control of toys and household electrical appliances.

In general, a continuous speech recognition apparatus has a structure as shown in FIG. 1. FIG. 1 is a schematic view illustrating a structure of a conventional continuous speech recognition apparatus. Referring to FIG. 1, a feature-extraction module 10 converts a voice input into the speech recognition apparatus into a feature vector by extracting information useful for speech recognition from the voice. A search module 20 searches for a word lattice having the highest probability from the feature vector by using a viterbi algorithm with reference to an acoustic module database (DB) 40, a pronunciation dictionary DB 50, and a language module DB 60, which have already been obtained through the learning process. For the purpose of large vocabulary recognition, vocabularies subject to recognition are provided in the form of a tree. Thus, the search module 20 searches for the vocabulary tree. A post-processing module 30 removes phonetic signs and tags from the search result, and performs a gather write in a syllabic unit, thereby providing text as a final recognition result.

The above conventional continuous speech recognition apparatus employs an acoustic module DB 40, a pronunciation dictionary DB 50, and a language module DB 60 for the purpose of speech recognition, and the language module DB 60 consists of frequency data of words established in a study text DB and probability data, which are probabilities of a Bigram or a Trigram operated by using the frequency data. The Bigram expresses a word lattice consisting of two words, and the Trigram expresses a word lattice consisting of three words.

When a topic domain of a speaker is changed, a previous language model may not perform its own functions. Thus, a new language model must be established corresponding to the change of the topic domain of the speaker. For instance, words used in the topic domain for a weather forecast have rules and features different from those of words used in the topic domain for travel. Accordingly, if a read speech language model suitable for weather forecast speech recognition is used for travel-related speech recognition, which requires a conventional speech language model, the performance of the travel-related speech recognition may be degraded. That is, the language model dedicated to a specific topic domain may degrade the performance of speech recognition if the topic domain is changed.

In order to solve the above problem, a language model used for various topic domains, rather than one topic domain, has been suggested. Such a language model includes a global language model, a parallel language model, and a topic dependency language model. The global language model can reduce consumed resources because only one language model is established. However, complexity of the language model is increased, so accuracy of speech recognition may be degraded. In addition, although the parallel language model can reduce complexity and search time, it uses many resources and an optimum result must be selected.

For this reason, a topic dependency language model is preferably used because it can reduce the complexity of the language model, the search time, and the amount of consumed resources. In addition, it is necessary to provide an apparatus, a method, and a medium that is capable of enhancing the efficiency of speech recognition by improving the performance for topic domain detection and language model conversion.

SUMMARY OF THE INVENTION

Additional aspects, features, and/or advantages of the invention will be set forth in part in the description which follows and, in part, will be apparent from the description, or may be learned by practice of the invention.

Accordingly, the present invention solves the above-mentioned problems occurring in the prior art, and provides an apparatus, method, and medium for dialogue speech recognition using topic domain detection that is capable of improving the accuracy and efficiency of dialogue speech recognition by detecting a topic domain through performing a forward search using a global language model, and then performing a backward decoding using a specific language model corresponding to the topic domain.

Another aspect of the present invention, there is provided a computer-readable recording medium having program code for executing a method of dialogue speech recognition using topic domain detection.

According to an aspect of the present invention, there is provided an apparatus for dialogue speech recognition using topic domain detection, the apparatus including: a forward search module that performs a forward search in order to create a word lattice similar to a feature vector, which is extracted from an input voice signal, with reference to a global language model database, a pronunciation dictionary database and an acoustic model database, which have been previously established; a topic-domain-detection module that detects a topic domain by inferring a topic based on meanings of vocabularies contained in the word lattice using information of the word lattice created as a result of the forward search; and a backward-decoding module that performs a backward decoding of the detected topic domain with reference to a specific topic domain language model database, which has been previously established, thereby outputting a speech recognition result for an input voice signal in text form.

According to another aspect of the present invention, there is provided a method of dialogue speech recognition using topic domain detection, the method including: performing a forward search in order to create a word lattice similar to a feature vector, which is extracted from an input voice signal, with reference to a global language model database, a pronunciation dictionary database and an acoustic model database, which have been previously established; detecting a topic domain by inferring a topic based on meanings of vocabularies contained in the word lattice using information of the word lattice created as a result of the forward search; and performing a backward decoding of the detected topic domain with reference to a specific topic domain language model database, which has been previously established, thereby outputting a speech recognition result for an input voice signal in text form.

According to another aspect of the present invention, there is provided a method of dialogue speech recognition using topic domain detection, the method including: performing a forward search in order to create a word lattice similar to a feature vector, which is extracted from an input voice signal, with reference to at least one previously established database; detecting a topic domain by inferring a topic based on meanings of vocabularies contained in the word lattice using information of the word lattice created as a result of the forward search; and performing a backward decoding of the detected topic domain with reference to a specific topic domain language model database, which has been previously established, thereby outputting a speech recognition result for an input voice signal in text form.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features and advantages of the invention will become apparent and more readily appreciated from the following description of exemplary embodiments, taken in conjunction with the accompanying drawings of which:

FIG. 7 is a block view illustrating an exemplary embodiment of a procedure for topic domain detection in a process of dialogue speech recognition shown in FIG. 6.

DETAILED DESCRIPTION OF THE PREFERRED EMBODIMENTS

Figure 1:
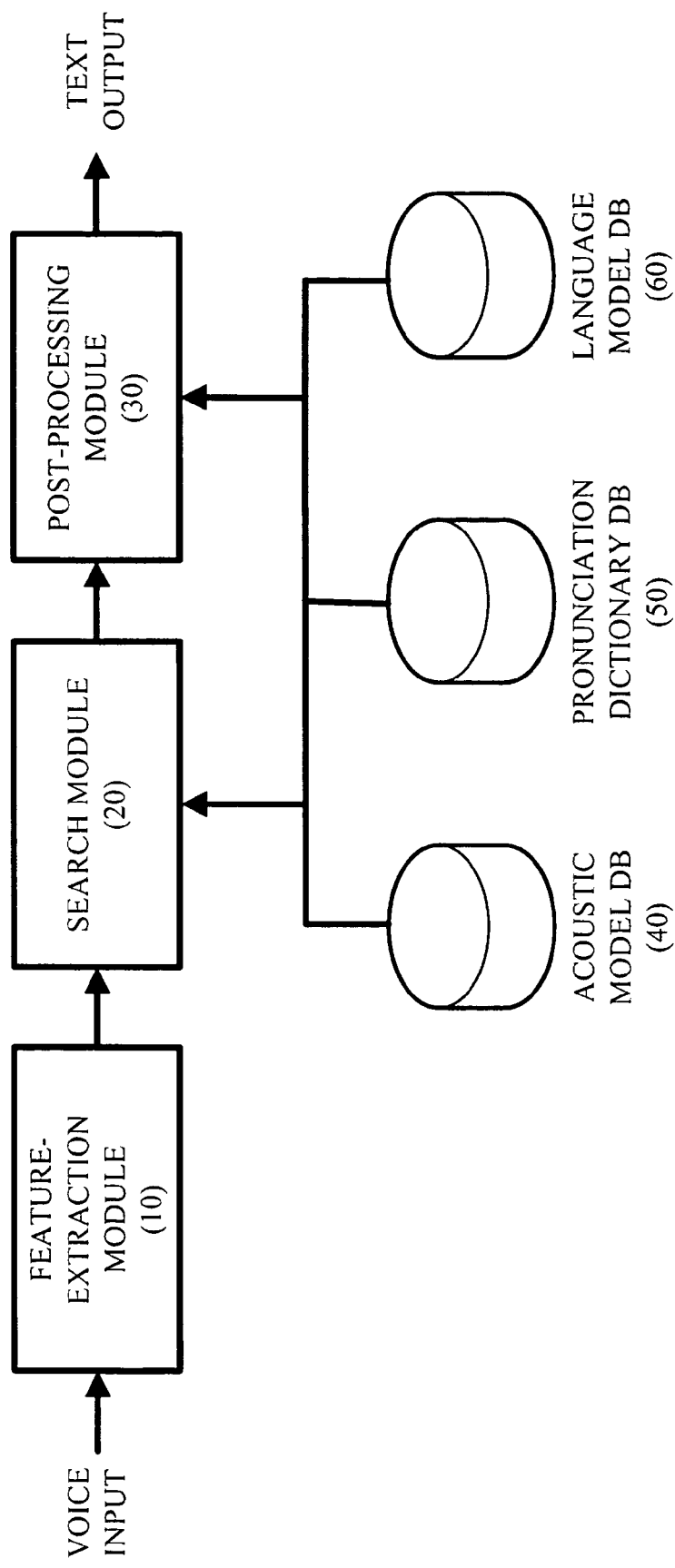
FIG. 1 is a block view illustrating the structure of a conventional continuous speech recognition apparatus.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
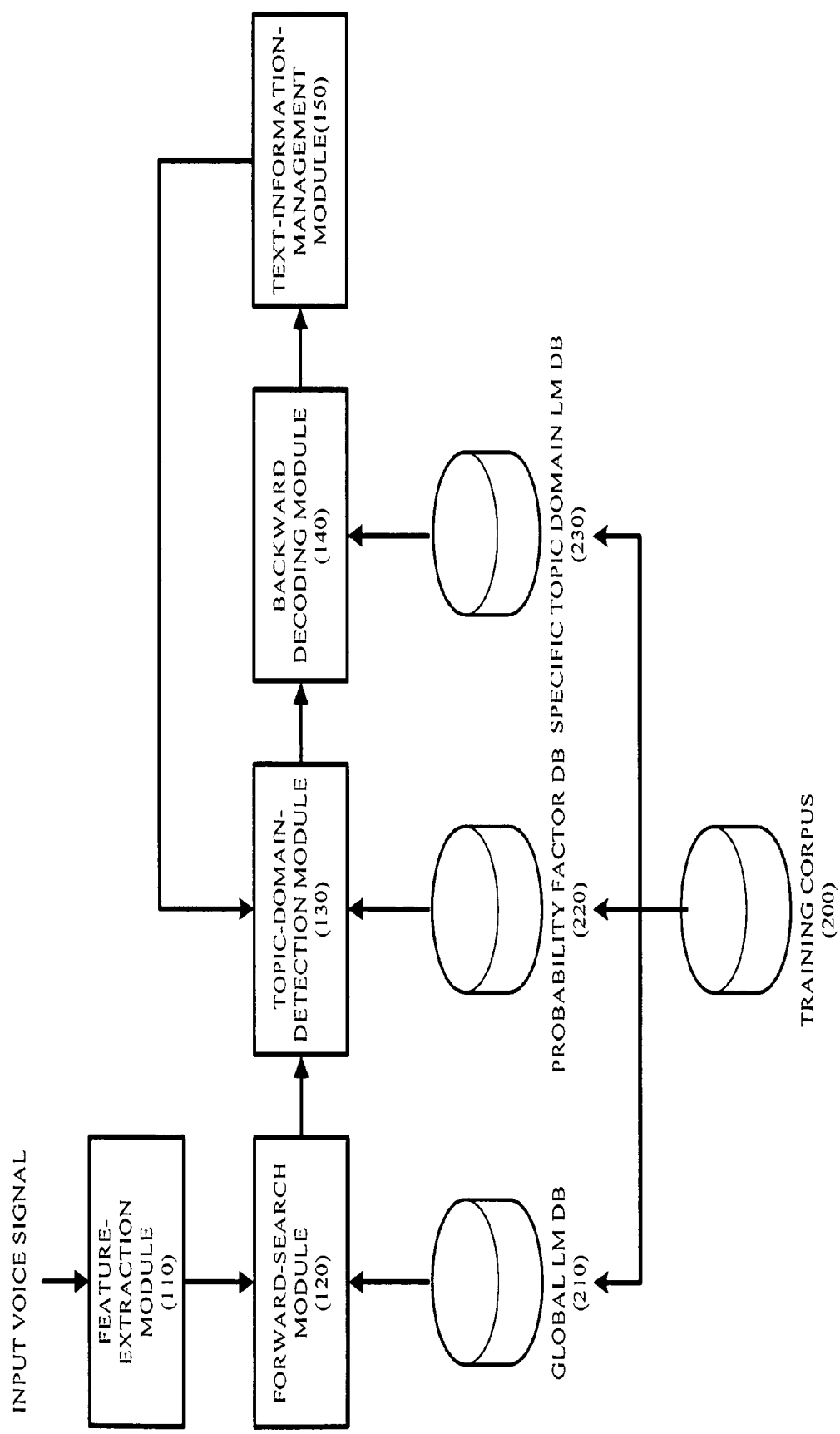
FIG. 2 is a block view illustrating a structure of a dialogue speech recognition apparatus using topic domain detection according to one exemplary embodiment of the present invention.

FIG. 2 is a block view illustrating a structure of a dialogue speech recognition apparatus using topic domain detection according to one exemplary embodiment of the present invention.

Referring to FIG. 2, the dialogue speech recognition apparatus according to one exemplary embodiment of the present invention includes a feature-extraction module 110, a forward search module 120, a topic-domain-detection module 130, a backward-decoding module 140 and a text-information-management module 150. In addition, a global language model DB 210, a probability factor DB 220, and a specific topic domain language model DB 230 are prepared in order to provide information to the forward search module 120, the topic-domain-detection module 130, and the backward-decoding module 140, respectively. The above DBs are created from a training corpus 200. The feature-extraction module 110 extracts a feature vector having useful information for speech recognition from a voice signal input into the dialogue speech recognition apparatus according to one exemplary embodiment of the present invention. By extracting the feature vector from the voice signal, redundant voice information can be removed and consistency of the same voice signals can be increased, while enhancing discrimination of the voice signal with respect to other voice signals. In order to extract the feature vector from the voice signal for speech recognition, the LPC (linear prediction coefficients) Cepstrum scheme, PLP (perceptual linear prediction) Cepstrum scheme, MFCC (Mel Frequency Cepstral Coefficient) scheme, or a filter bank energy scheme can be employed. However, those skilled in the art will appreciate that the present invention is not limited to the above schemes.

Figure 4:
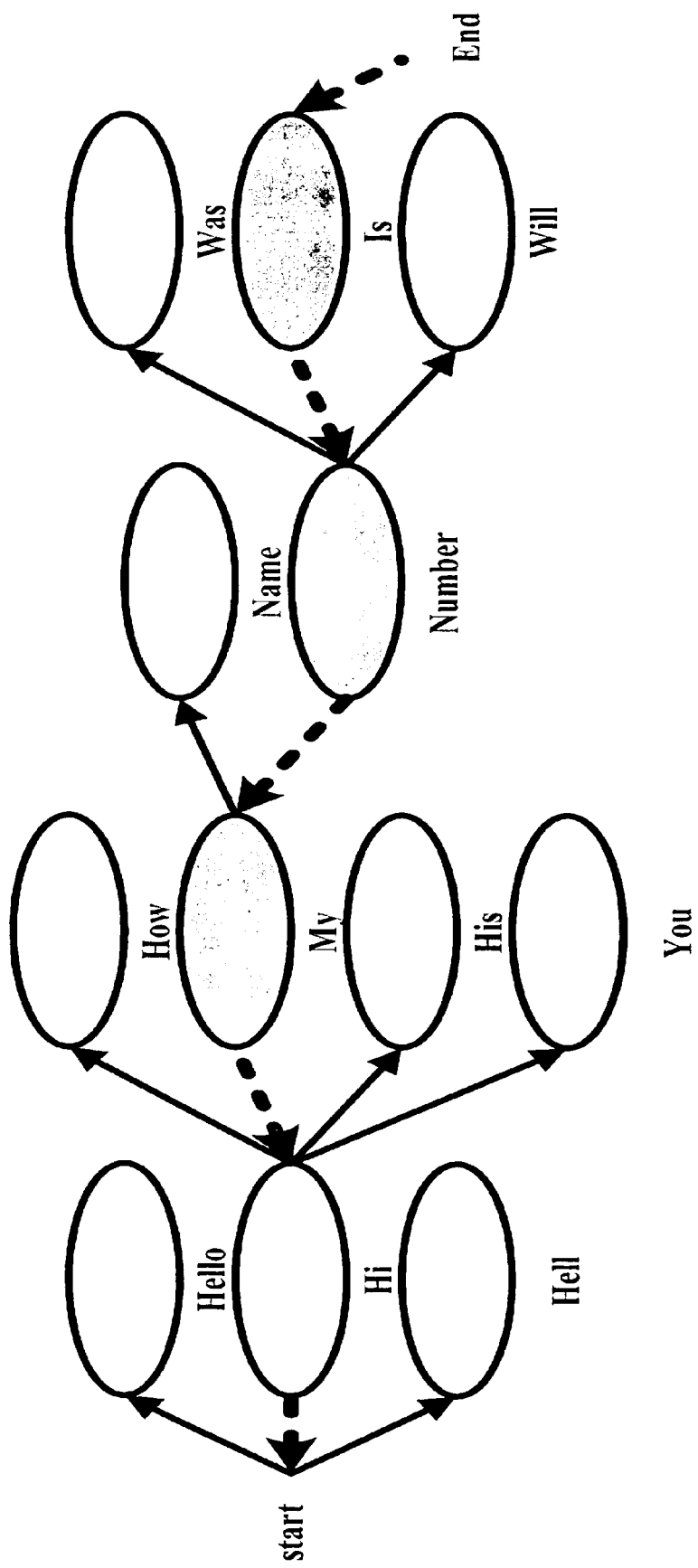
FIG. 4 is a schematic view illustrating a structure of a word lattice created as a result of a forward search during a procedure for dialogue speech recognition according to one exemplary embodiment of the present invention.

The forward search module 120 receives the feature vector, and then performs a forward search for creating a word lattice similar to the feature vector with reference to the global language model DB 210, a pronunciation dictionary DB (not shown) and an acoustic model DB (not shown), which have been previously established. The feature vector extracted by the feature-extraction module 110 may undergo the speech recognition procedure through the forward search module 120, the backward-decoding module 140, and others. To this end, it is necessary to provide an acoustic model for modeling and comparing signal characteristics of a voice, a pronunciation dictionary for modeling the pronunciation of vocabularies being recognized in the form of a phoneme array, and a space for storing information of a language model for modeling the language sequence of words or syllables corresponding to vocabularies being recognized. In the process of forward search, the word lattice including all candidate vocabularies suitable for the input voice is formed based on the database of the acoustic model, the pronunciation dictionary, and the language model. Such a word lattice is shown in FIG. 4, which is a schematic view illustrating the structure of the word lattice created as a result of the forward search during the procedure for dialogue speech recognition. Referring to FIG. 4, the word lattice includes all candidate vocabularies suitable for the input voice. For instance, the candidate vocabularies, such as "hello, Hi, and Hell", "How, My, His and You", "Name and Number", and "Was, Is, Will", are obtained as a result of the forward search, and a sentence is completed when they are combined through the word lattice. In addition, the vocabulary group "Hi, My, Number, and Is" shown with a shadow is determined through the backward decoding, which will be described in more detail later.

The topic-domain-detection module 130 detects a topic domain including a topic of a speaker by inferring the topic based on the meaning of the vocabularies contained in the word lattice using information of the word lattice created as a result of the forward search. The topic-domain-detection module 130 includes three modules. Hereinafter, the structure of the topic-domain-detection module 130 will be described in detail with reference to FIG. 3.

Figure 3:
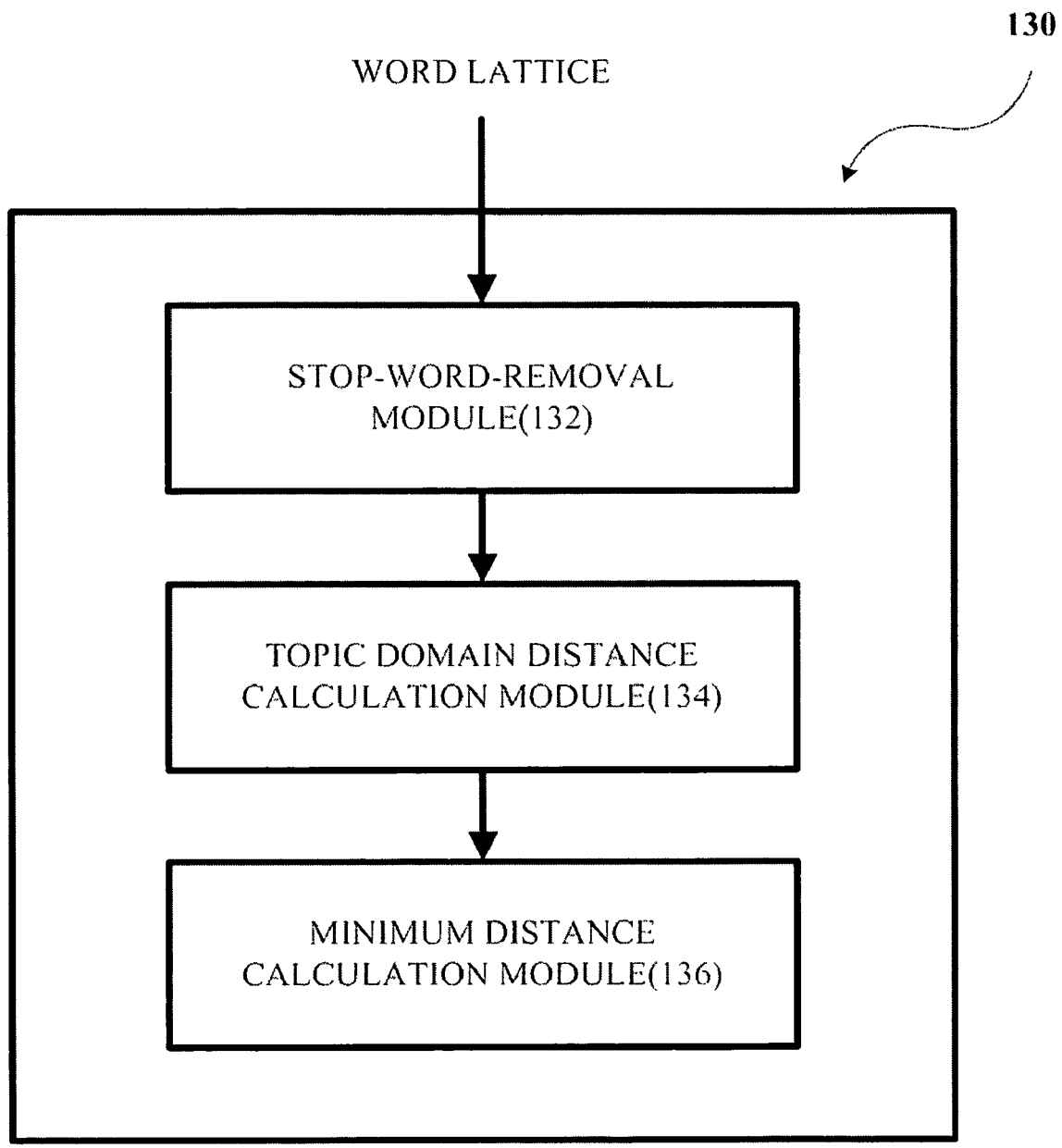
FIG. 3 is a block view illustrating an exemplary embodiment of a structure of a topic-domain-detection module of a dialogue speech recognition apparatus shown in FIG. 2.

FIG. 3 is a block view illustrating the structure of the topic-domain-detection module 130 of the dialogue speech recognition apparatus shown in FIG. 2. The topic-domain-detection module 130 includes a stop-word-removal module 132, a topic domain distance calculation module 134 and a minimum distance detection module 136.

The stop-word-removal module 132 removes stop words, which have no concern with the topic, from among the vocabularies forming the word lattice created as a result of the forward search of the forward search module 120. That is, when the topic domain is determined based on the vocabularies contained in the word lattice, vocabularies except for the stop words, are inputted into the topic domain distance calculation module 134. Examples of stop words include particles, prefixes, articles, suffixes, and the like. One or more of particles, prefixes, articles, suffixes, or the like may be stop words in exemplary embodiments.

The topic domain distance calculation module 134 receives the word lattice, in which the stop words have been removed, from the stop-word-removal module 120 and then calculates the distance from each available topic domain based on the vocabularies contained in the word lattice. In particular, history information for an output text obtained from the text-information-management module 150 is fedback to the topic domain distance calculation module 134, and the topic domain distance calculation module 134 calculates the distance relative to the topic domains by using information obtained from the probability factor DB 220 having various probability factor data used for calculating the distance relative to the topic domains. The distance calculation algorithm can be expressed in the form of an equation including four main factors:

$$Pr(D_i | w_1 \cdots w_n) \cong \prod_{j=1}^{n} Pr(w_j | D_i) \cdot (1/DF_{wj}) \cdot w_{domain} \cdot (WF_{Di}/n)$$

Herein, $Pr(D_i | w_1 \ldots w_n)$ shown in the left side of the equation refers to a probability of selecting an $i^{th}$ topic domain based on n vocabularies, that is, a distance relative to the $i^{th}$ topic domain.

In addition, $Pr(w_j | D_i)$, which is the first factor in the right side of the Equation, refers to a probability of selecting a $j^{th}$ topic word $w_j$ in a state in which the $i^{th}$ topic domain ($D_i$) has been selected. That is, $Pr(w_j | D_i)$ refers to "representation" of the topic word $w_j$. The second factor $1/DF_{wj}$ refers to a reciprocal number of a topic domain frequency, indicating the number of topic domains related to the topic word $w_j$. That is, $1/DF_{wj}$ refers to "discrimination" of the topic word $w_j$ relative to the topic domains. In other words, if the topic word $w_j$ is related to various topic domains, the topic word $w_j$ may not exert a great influence upon topic domain detection, so the topic word $w_j$ has inferior "discrimination". However, if the topic word $w_j$ is related to only one topic domain, the topic word $w_j$ may exert a great influence upon topic domain detection, so the topic word $w_j$ has superior "discrimination". The above two factors exhibiting "representation" and "discrimination" are generally used for information search or topic classification. In addition, the third factor $w_{domain}$ refers to a "context weight factor" representing a weight of a probability value for a context. That is, the third factor gives a probability weight by detecting whether the candidate topic domain is the same as the previous topic domain. In general, since the dialogue of the speaker has a strong connection, if the candidate topic is the same as the previous topic, a higher probability weight must be given. In contrast, if the current candidate topic is different from the previous topic, a lower probability weight must be given. The fourth factor $WF_{Di}/n$ refers to a "word frequency factor", which is used for reflecting the frequency of topic words supporting the $i^{th}$ topic domain ($D_i$). That is, the fourth factor $WF_{Di}/n$ represents the number of vocabularies concerned with the candidate topic domain in the present word lattice. The "context weight factor" and the "word frequency factor" are obtained during run time of the speech recognition procedure. In particular, the "context weight factor" is fedback from the text-information-management module 150, which will be described later.

When the distances relative to some candidate topic domains have been calculated based on the Equation having the above factors, it is necessary to determine a minimum distance relative to the topic domain from among the distances. To this end, the minimum distance detection module 136 detects the minimum distance relative to the topic domain. That is, the minimum distance detection module 136 detects the minimum distance relative to the topic domain from among the distances calculated according to the algorithm shown in the Equation. In order to determine the minimum distance, it is necessary to detect the topic domain, which is the same as the previous topic domain, from among the candidate topic domains. History information related to the dialogue topic concerned with the previous topic domain can be obtained from the text-information-management module 150, which will be described later.

The backward-decoding module 140 performs the backward decoding relative to the detected topic domain with reference to the specific topic domain language model DB 230, which has been previously established, thereby outputting a speech recognition result for an input voice signal in the form of a text. In addition, if the text is not output even though the backward decoding has been performed with reference to the specific topic domain language model DB 230, it is preferred for the backward-decoding module 140 to further perform a backward sub-decoding with reference to the global language model DB 210. However, it should be noted that the backward sub-decoding is not always performed, but is performed only when the text is not output even if the backward decoding has been performed with reference to the specific topic domain language model DB 230. At this time, in order to perform the backward sub-decoding with reference to the global language model DB 210, the distance relative to the topic domain must be set within a predetermined threshold.

The text-information-management module 150 stores and manages various types of information including history information of the text and information related to the topic domain of the text, which is output by the backward-decoding module 140. Among various functions of the text-information-management module 150, the representative function related to speech recognition is a history management with respect to the dialogue of the speaker. The history management includes a management for information related to the continuous dialogue or commands of the speaker and a management for information related to the topic domain and the speech recognition result relative to the dialogue of the speaker. Therefore, the topic-domain-detection module 130 receives the word lattice created as a result of the forward search relative to the present dialogue and obtains the history information relative to the previous dialogue from the text-information-management module 150 in order to take the word lattice and the history information into consideration when determining the topic domain.

In the speech recognition apparatus according to the present invention, the forward search module 120, the topic-domain-detection module 130 and the backward-decoding module 140 may perform their functions with reference to various databases. At this time, the forward search module 120 performs its function with reference to the global language model DB 210, the topic-domain-detection module 130 performs its function with reference to the probability factor DB 220 and the backward-decoding module 140 performs its function with reference to the specific topic domain language model DB 230. Herein, the global language model DB 210 and the specific topic domain language model DB 230, except for the probability factor DB 220, are in the form of a language model. The language model serves as a grammar in the speech recognition system. That is, the language continuous speech recognition system cannot recognize all sentences, but can recognize sentences prepared with a regular grammar, so that it is possible to reduce the search space of the speech recognition system by using the language model in the search process of the speech recognition system. In addition, the language model may raise the probability of correct sentences, so the performance of the speech recognition can be improved.

The global language model DB 210 has extensive information for all languages regardless of the topic domain and the specific topic domain language model DB 230 includes language models prepared for each topic domain. The specific topic domain language model DB 230 is similar to the global language model DB 210 except that the specific topic domain language model DB 230 includes the language models for specific topic domains, instead of all language models. Meanwhile, the probability factor DB 220 stores factors related to probability values used when the distance relative to the topic domain is calculated by the topic-domain-detection module 130. As described above, the topic domain detection procedure is performed according to the algorithm shown in the Equation including four factors, in which the values of the first and second factors exhibiting "representation" and "discrimination" can be previously obtained by using a corpus related to the corresponding topic domain. Such a corpus is called a "training corpus" 200. The training corpus 200 refers to text data to be spoken, which have been previously established according to topic domains. The data may undergo the model training procedure by using the training corpus 200 in order to obtain the probability value related to the "representation" and "discrimination" and then the data are stored and managed in the probability factor DB 220. That is, the content of the probability factor DB 220 is prepared by using the training corpus, which has been previously established according to topic domains. Meanwhile, if the dialogue continuous speech recognition system, which is provided for speech recognition in various topic domains, has sufficient training corpuses, it is possible to establish a reliable language model.

The term "section", "module" or "table", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and the modules can operate at least one processor (e.g. central processing unit (CPU)) provided in a device.

Figure 5:
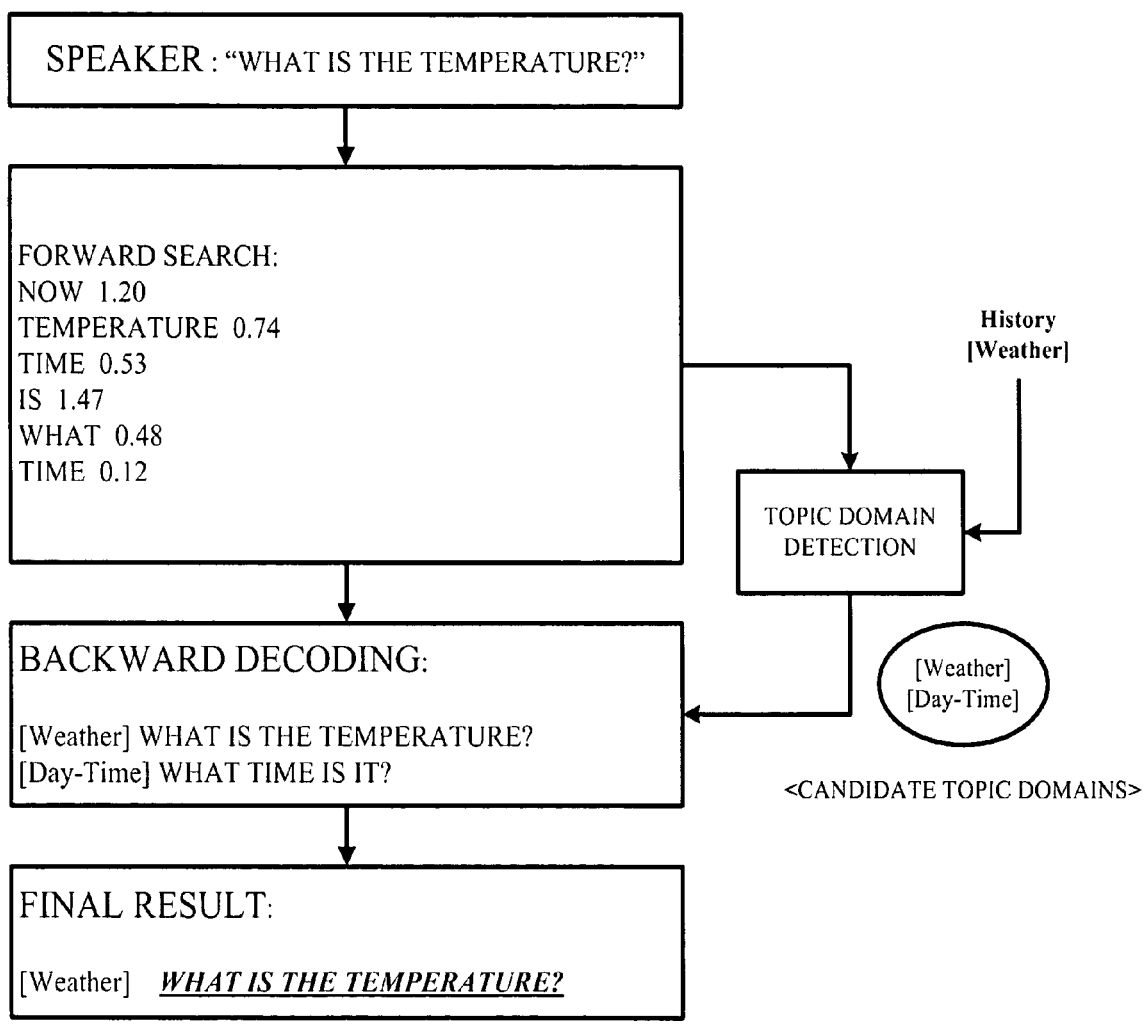
FIG. 5 is a block view illustrating a procedure for speech recognition using topic domain detection, which is performed by a dialogue speech recognition apparatus according to one exemplary embodiment of the present invention.

FIG. 5 is a block view illustrating the procedure for speech recognition using topic domain detection, which is performed by the dialogue speech recognition apparatus according to one exemplary embodiment of the present invention. If the speaker speaks a sentence "What is the temperature now?", the forward search is performed with respect to the sentence and an acoustic score is recorded for each word of "What", "is" "the" "temperature" and "now". In addition, the candidate topic domains are calculated according to the algorithm shown in the Equation. Here, it can be understood from FIG. 5 that the topic domains of "weather" and "day-time" are selected as candidate topic domains. Accordingly, if the backward decoding is performed with respect to the selected topic domains, a text "What is the temperature now" can be output as a result of backward decoding for the "weather" topic domain and a text "What time is it now" can be output as a result of backward decoding for the "day-time" topic domain. Accordingly, the text of the "weather" topic domain is only output with reference to history information of the previous topic domain stored in the text-information-management module 150.

Figure 6:
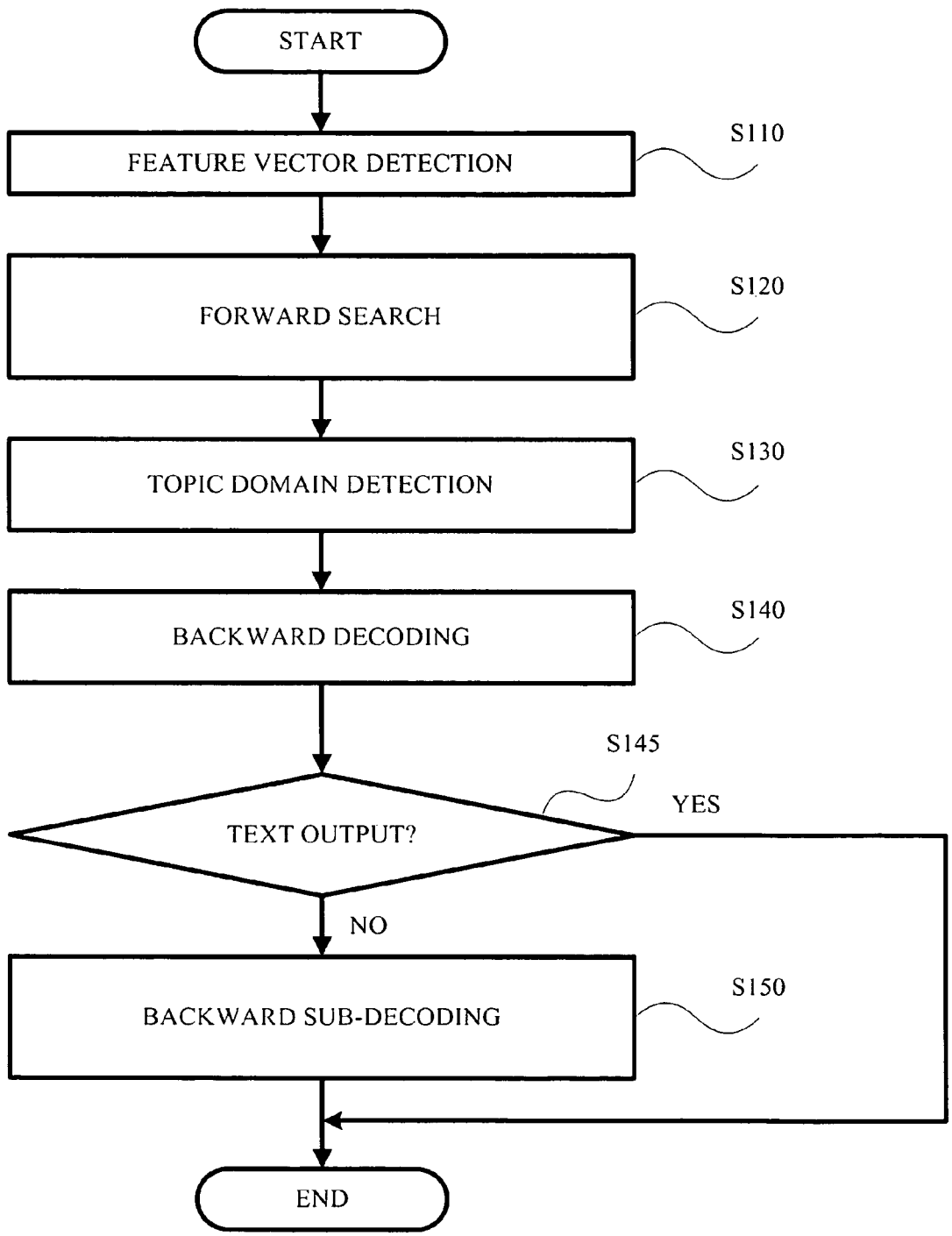
FIG. 6 is a flowchart illustrating a procedure for dialogue speech recognition using topic domain detection according to one exemplary embodiment of the present invention.

Hereinafter, the method for speech recognition according to one exemplary embodiment of the present invention will be described with reference to FIGS. 6 and 7. FIG. 6 is a flowchart illustrating the procedure for dialogue speech recognition using topic domain detection according to one exemplary embodiment of the present invention, and FIG. 7 is a block view illustrating the procedure for topic domain detection in the process of dialogue speech recognition shown in FIG. 6.

Referring to FIGS. 6 and 7, if a speaker sends a sentence "What is the temperature now", the feature-extraction module 110 extracts the feature vector from the voice signal (S110). Then, the forward search module 120 performs forward search for creating a word lattice similar to the feature vector with reference to the global language model DB 210, the pronunciation dictionary DB (not shown) and the acoustic model DB (not shown), which have been previously established (S120).

In addition, the topic-domain-detection module 130 performs topic domain detection in order to detect the topic domain by inferring the topic based on the meaning of the vocabularies contained in the word lattice using information of the word lattice created as a result of the forward search (S130), which will be described later in more detail with reference to FIG. 7. Among vocabularies forming the word lattice, the stop words, which have no concern with the topic domain, are removed by the stop-word-removal module 132 (S132). The topic domain distance calculation module 134 receives the word lattice, in which the stop words have been removed, and then calculates the distance relative to each topic domain based on the vocabularies contained in the word lattice (S134). Preferably, the topic domain distance calculation module 134 calculates the distance relative to the topic domains by using information obtained from the text created as a result of the backward decoding and information obtained from the probability factor DB 220 having various probability factor data used for calculating the distance relative to the topic domains. Meanwhile, the content of the probability factor DB 220 is created by using the training corpus 200 including text information to be spoken, which has been previously established according to topic domains. The distance calculation algorithm can be obtained by using created factors. That is, as described above, the distance calculation algorithm can be expressed in the form of an Equation including four factors:

$$Pr(D_i|w_1 \cdots w_n) \cong \prod_{j=1}^{n} Pr(w_j|D_i) \cdot (1/DF_{wj}) \cdot w_{domain} \cdot (WF_{Di}/n)$$

Herein, $Pr(D_i|w_1 \ldots w_n)$ shown in the left side of the Equation refers to a probability of selecting an $i^{th}$ topic domain based on n vocabularies, that is, a distance relative to the $i^{th}$ topic domain. In addition, $Pr(w_j|D_i)$, which is the first factor in the right side of the Equation, refers to a probability of selecting a $j^{th}$ topic word $w_j$ in a state in which the $i^{th}$ topic domain ($D_i$) has been selected. That is, $Pr(w_j|D_i)$ refers to "representation" of the topic word $w_j$. The second factor $1/DF_{wj}$ refers to a reciprocal number of a topic domain frequency, indicating the number of topic domains related to the topic word $w_j$. That is, $1/DF_{wj}$ refers to "discrimination" of the topic word $w_j$ relative to the topic domains. In addition, the third factor $w_{domain}$ refers to a "context weight factor" representing a weight of a probability value for a context. That is, the third factor gives a probability weight by detecting whether the candidate topic domain is the same as the previous topic domain. The fourth factor $WF_{Di}/n$ refers to a "word frequency factor", which is used for reflecting the frequency of topic words supporting the $i^{th}$ topic domain ($D_i$). That is, the fourth factor $WF_{Di}/n$ represents the number of vocabularies concerned with the candidate topic domain in the present word lattice.

Among distances relative to the topic domains, which are calculated through the Equation, the topic domain having the minimum distance is detected by the minimum distance detection module 136 (S136).

Then, the backward-decoding module 140 performs the backward decoding relative to the detected topic domain with reference to the specific topic domain language model DB 230, which has been previously established, thereby outputting a speech recognition result for an input voice signal in the form of a text (S140). In addition, if the text is not output even though the backward decoding has been performed with reference to the specific topic domain language model DB 230 (S145), the backward-decoding module 140 further performs a backward sub-decoding with reference to the global language model DB 210 (S150).

Experiment has been preformed in order to compare the performance between the dialogue speech recognition apparatus using topic domain detection according to the present invention and the conventional continuous speech recognition apparatus.

EXPERIMENTAL EXAMPLE

Speech recognition experiment was performed under the following conditions.
Language: Korean
Dialogue Type: Command & Control, Question & Answer, and Chatting
Training Set: 12 topic domains
Speech Recognition Engine: continuous speech recognition device.

In addition, three models were used in which model A is a global language model, model B is a language model for a best-1 topic domain, which is selected through topic domain detection, and model C is a language model for n specific topic domains prepared according to a score difference resulting from topic domain detection. The experimental results are shown in FIGS. 8A and 8B.

Figures 8A, 8B:
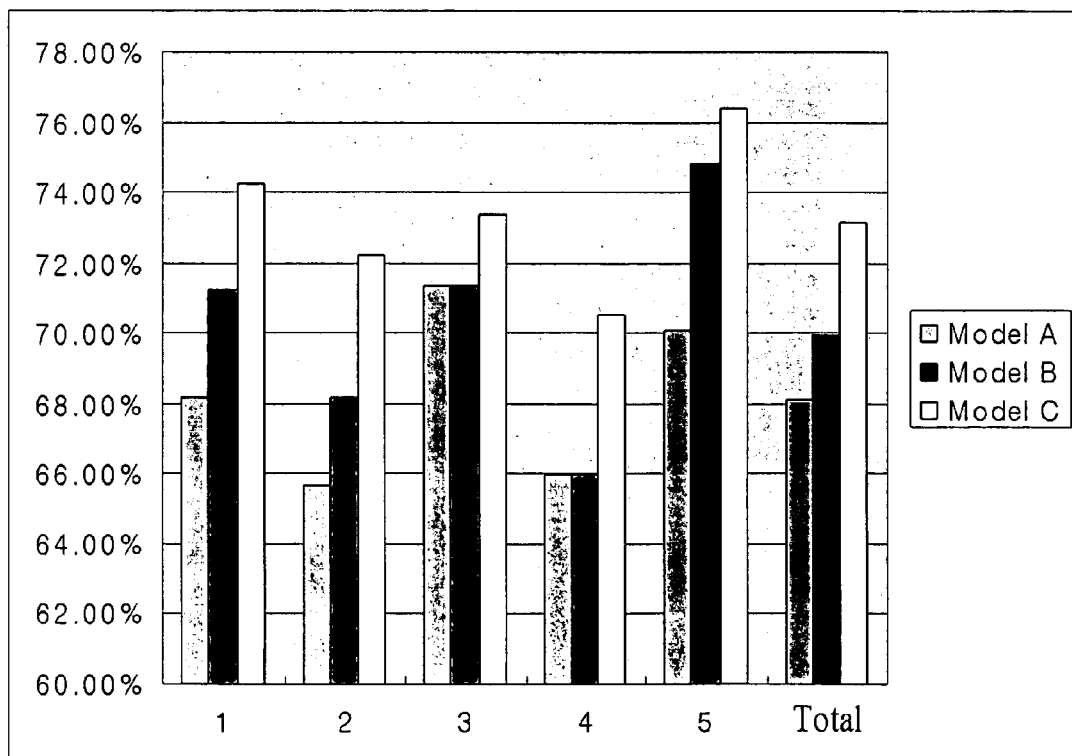
FIGS. 8A and 8B illustrate experimental results from an experiment performed in order to compare the performance between a dialogue speech recognition apparatus using topic domain detection according to an exemplary embodiment of the present invention and the conventional continuous speech recognition apparatus.

As can be understood from the experimental results shown in FIGS. 8A and 8B, there is no great difference between model A and model B in terms of sentence accuracy. However, as can be seen from the above graph, model C has an accuracy of 73.12%, which is greater than that of model A and model B.

That is, the method for dialogue speech recognition using topic domain detection according to one exemplary embodiment of the present invention can significantly improve accuracy of sentence recognition if the topic domain is accurately detected.

Further, those skilled in the art will appreciate that the present invention may be stored in a computer-readable recording medium having program code for executing the method via a computer.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), and hardware storage devices (e.g., read only memory media, random access memory media, flash memories, etc., which may store computer readable code/instructions, data files, data structures, etc. The medium/media may also be a distributed network, so that the computer readable code/instructions is/are stored and executed in a distributed fashion. The computer readable code/instructions may be executed by one or more processors. The computer readable code/instructions may also be executed and/or embodied in at least one application specific integrated circuit (ASIC), field programmable gate array (FPGA), or the like.

As described above, according to an apparatus, a method, and a medium for dialogue speech recognition using topic domain detection of the present invention, a topic domain is detected through a forward search by using the global language model, and then a backward decoding is performed by using a specific language model corresponding to the detected topic domain, so that accuracy and efficiency can be significantly improved during dialogue speech recognition. The present invention is not limited to these aspects, features, and/or advantages, and other aspects, features, and/or advantages can be achieved by the present invention.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for dialogue speech recognition using topic domain detection, comprising:
   a forward search module to perform a forward search to create a word lattice based on a feature vector, which is extracted from an input voice signal, with reference to a global language model database, a pronunciation dictionary database and an acoustic model database, which have been previously established;
   a topic-domain-detection module to detect a topic domain during run-time of a speech recognition procedure from among one or more candidate topic domains, by inferring a topic based on meanings of vocabularies contained in the word lattice using information of the word lattice created as a result of the forward search;
   a backward-decoding module to perform a backward decoding relative to the detected topic domain with reference to a specific topic domain language model database, which has been previously established, thereby outputting a speech recognition result for an input voice signal in the form of a text; and
   a text-information-management module to store and manage information including information related to the topic domain of the output text which is output by the backward-decoding module, and history information which includes a previous topic domain detected relative to a previous output text obtained as a result of a previous backward decoding of a previous dialogue, and
   wherein, the topic-domain-detection module further detects the topic domain by determining whether one of the one or more candidate topic domains is the same as a topic domain which is the previous topic domain detected during run-time, using the history information which includes the previous topic domain detected,
   wherein the topic-domain-detection module includes:
   a stop-word-removal module to remove stop words, which are not concerned with the topic, among vocabularies forming the word lattice;
   a topic domain distance calculation module, which receives the word lattice, in which the stop words have been removed, to calculate a distance for each of the one or more candidate topic domains based on the vocabularies contained in the word lattice, and receives history information including the previous output text from the text-information-management module to calculate the distance for each of the one or more candidate topic domains, and calculates the distance for each of the one or more candidate topic domains according to a plurality of probability factors,
   wherein for a first factor, a higher probability weight is given to a candidate topic domain if it is the same as the previous topic domain detected, and a lower probability weight is given to a candidate topic domain if it is different from the previous topic domain detected,
   wherein for a second factor, a higher probability weight is given to a candidate topic domain in accordance with an increase in a frequency of topic words supporting the candidate topic domain among vocabularies forming the word lattice, and
   the first factor and second factor are obtained during runtime of the speech recognition procedure.

2. The apparatus of claim 1, wherein the topic-domain-detection module further includes:
   a minimum distance detection module to detect a topic domain having a minimum distance among the one or more candidate topic domains having various distances.

3. The apparatus of claim 2, wherein the topic domain distance calculation module calculates the distance for each of the one or more candidate topic domains by using information obtained from the text-information-management module and information obtained from a probability factor database having probability factors used for calculating the distance for each of the one or more candidate topic domains.

4. The apparatus of claim 3, wherein contents of the probability factor database are created by using a training corpus including text information to be spoken, which has been previously established according to topic domains.

5. The apparatus of claim 3, wherein the topic domain distance calculation module calculates the distance for each of the one or more candidate topic domains by using the following equation having probability factors:

$$Pr(D_i | w_1 \cdots w_n) \cong \prod_{j=1}^{n} Pr(w_j | D_i) \cdot (1/DF_{wj}) \cdot w_{domain} \cdot (WF_{Di}/n)$$

wherein, $Pr(D_i | w_1 \ldots w_n)$ is a probability of selecting an $i^{th}$ topic domain based on n vocabularies, $Pr(w_j | D_i)$ is a probability of selecting a $j^{th}$ topic word $w_j$ in a state in which the $i^{th}$ topic domain ($D_i$) has been selected, $DF_{wj}$ is a topic domain frequency, indicating a number of topic domains related to the topic word $w_j$, $w_{domain}$ is a context weight factor, and $WF_{Di}$ is a topic word frequency representing a number of topic words supporting the $i^{th}$ topic domain ($D_i$).

6. The apparatus of claim 1, wherein the backward-decoding module further performs a backward sub-decoding with reference to the global language model database, if the text is not output even though the backward decoding has been performed with reference to the specific topic domain language model database.

7. A method of dialogue speech recognition using topic domain detection, comprising:
   performing a forward search to create a word lattice based on a feature vector, which is extracted from an input voice signal, with reference to a global language model database, a pronunciation dictionary database and an acoustic model database, which have been previously established;
   detecting a topic domain during run-time of a speech recognition procedure from among one or more candidate topic domains, by inferring a topic based on meanings of vocabularies contained in the word lattice using information of the word lattice created as a result of the forward search; and
   performing a backward decoding relative to the detected topic domain with reference to a specific topic domain language model database, which has been previously established, thereby outputting a speech recognition result for an input voice signal in the form of a text, wherein, the detecting a topic domain further comprises determining whether one of the one or more candidate topic domains is the same as a topic domain which is the previous topic domain detected during run-time, relative to a previous output text obtained as a result of a previous backward decoding of a previous dialogue, using history information which includes the previous topic domain detected, wherein detecting the topic domain includes:

removing stop words, which have no concern with the topic, among vocabularies forming the word lattice;

calculating a distance for each of the one or more candidate topic domains based on the vocabularies contained in the word lattice by receiving the word lattice, in which the stop words have been removed, wherein the calculating the distance for each of the one or more candidate topic domains comprises receiving history information including the previous output text, to calculate the distance for each of the one or more candidate topic domains, and calculating the distance for each of the one or more candidate topic domains according to a plurality of probability factors, wherein for a first factor, a higher probability weight is given to a candidate topic domain if it is the same as the previous topic domain detected, and a lower probability weight is given to a candidate topic domain if it is different from the previous topic domain detected, for a second factor, a higher probability weight is given to a candidate topic domain in accordance with an increase in a frequency of topic words supporting the candidate topic domain among vocabularies forming the word lattice, and the first factor and second factor are obtained during run-time of the speech recognition procedure.

8. The method of claim 7, wherein detecting the topic domain further includes:

detecting a topic domain having a minimum distance among the one or more candidate topic domains having various distances.

9. The method of claim 8, wherein the calculating the distance involves using the history information relative to the previous dialogue for the output text obtained as the result of the backward decoding of the previous dialogue and information obtained from a probability factor database having probability factors used for calculating the distance for each of the one or more candidate topic domains.

10. The method of claim 9, wherein contents of the probability factor database are created using a training corpus including text information to be spoken, which has been previously established according to topic domains.

11. The method of claim 9, wherein calculating the distance further comprises calculating the distance using the equation:

$$Pr(D_i|w_1 \cdots w_n) \cong \prod_{j=1}^{n} Pr(w_j|D_i) \cdot (1/DF_{wj}) \cdot w_{domain} \cdot (WF_{Di}/n)$$

wherein, $Pr(D_i|w_1 \ldots w_n)$ is a probability of selecting an $i^{th}$ topic domain based on n vocabularies, $Pr(w_j|D_i)$ is a probability of selecting a $j^{th}$ topic word $w_j$ in a state in which the $i^{th}$ topic domain ($D_i$) has been selected, $DF_{wj}$ is a topic domain frequency, indicating a number of topic domains related to the topic word $w_j$, $w_{domain}$ is a context weight factor, and $WF_{Di}$ is a topic word frequency representing a number of topic words supporting the $i^{th}$ topic domain ($D_i$).

12. The method of claim 9, wherein performing the backward decoding comprises performing a backward sub-decoding with reference to the global language model database, if the text is not output even though the backward decoding has been performed with reference to the specific topic domain language model database.

13. The method of claim 7, further comprising:

storing and managing information, including information related to the topic domain of the output text which is output by the backward-decoding, and history information which includes the previous topic domain detected relative to the previous output text obtained as a result of the previous backward decoding of the previous dialogue.

14. At least one non-transitory computer readable medium comprising computer readable instructions implementing the method of claim 7.

15. A method of dialogue speech recognition using topic domain detection, comprising:

performing a forward search to create a word lattice based on a feature vector, which is extracted from an input voice signal, with reference to at least one previously established database;

detecting a topic domain during run-time of a speech recognition procedure from among one or more candidate topic domains, by inferring a topic based on meanings of vocabularies contained in the word lattice using information of the word lattice created as a result of the forward search; and performing a backward decoding relative to the detected topic domain with reference to a specific topic domain language model database, which has been previously established, thereby outputting a speech recognition result for an input voice signal in the form of a text, wherein, the detecting a topic domain further comprises determining whether one of the one or more candidate topic domains is the same as a topic domain which is the previous topic domain detected during run time, relative to a previous output text obtained as a result of a previous backward decoding of a previous dialogue, using history information which includes the previous topic domain detected, wherein detecting the topic domain includes:

removing stop words, which have no concern with the topic, among vocabularies forming the word lattice;

calculating a distance for each of the one or more candidate topic domains based on the vocabularies contained in the word lattice by receiving the word lattice, in which the stop words have been removed, wherein the calculating the distance for each of the one or more candidate topic domains comprises receiving history information including the previous output text, to calculate the distance for each of the one or more candidate topic domains, and calculating the distance for each of the one or more candidate topic domains according to a plurality of probability factors, wherein for a first factor, a higher probability weight is given to a candidate topic domain if it is the same as the previous topic domain detected, and a lower probability weight is given to a candidate topic domain if it is different from the previous topic domain detected, for a second factor, a higher probability weight is given to a candidate topic domain in accordance with an increase in a frequency of topic words supporting the candidate topic domain among vocabularies forming the word lattice, and the first factor and second factor are obtained during runtime of the speech recognition procedure.

16. The method of claim 15, wherein the at least one previously established database is at least one of a global language model database, a pronunciation dictionary database and an acoustic model database.

17. The method of claim 15, further comprising:
storing and managing information, including information related to the topic domain of the output text which is output by the backward-decoding, and history information which includes the previous topic domain detected relative to the previous output text obtained as a result of the previous backward decoding of the previous dialogue.

18. At least one non-transitory computer readable medium comprising computer readable instructions implementing the method of claim 15.

* * * * *